(No Model.) 4 Sheets—Sheet 1.

L. P. BEST.
MANUFACTURE OF STARCH.

No. 278,490. Patented May 29, 1883.

WITNESSES:
C. Neveux
T. Sedgwick

INVENTOR:
L. P. Best
BY Munn & Co
ATTORNEYS.

(No Model.) 4 Sheets—Sheet 4.

L. P. BEST.
MANUFACTURE OF STARCH.

No. 278,490. Patented May 29, 1883.

WITNESSES:
C. Neveux
C. Sedgwick

INVENTOR:
L. P. Best
BY Munn &Co
ATTORNEYS.

UNITED STATES PATENT OFFICE.

LOUIS P. BEST, OF DAVENPORT, IOWA.

MANUFACTURE OF STARCH.

SPECIFICATION forming part of Letters Patent No. 278,490, dated May 29, 1883.

Application filed August 12, 1882. (No model.)

*To all whom it may concern:*

Be it known that I, LOUIS P. BEST, of Davenport, in the county of Scott and State of Iowa, have invented certain new and useful Improvements in the Manufacture of Starch, of which the following is a full, clear, and exact description.

This invention relates to improvements in the manufacture of starch and other products from grain obtained by separation of the starch, and preparing the refuse for an article of commerce.

The invention consists in certain novel methods of treating the steeped corn or grain and products derived therefrom; also in means for carrying out such methods, whereby a more perfect extraction of the starch is produced, a purer and less perishable stock-feeding product is obtained, water and space are economized, the drying of the refuse is cheapened, and other advantages are obtained, substantially as hereinafter described.

Reference is to be had to the accompanying drawings, forming part of this specification, in which similar letters of reference indicate corresponding parts in all the figures.

Figure 1:
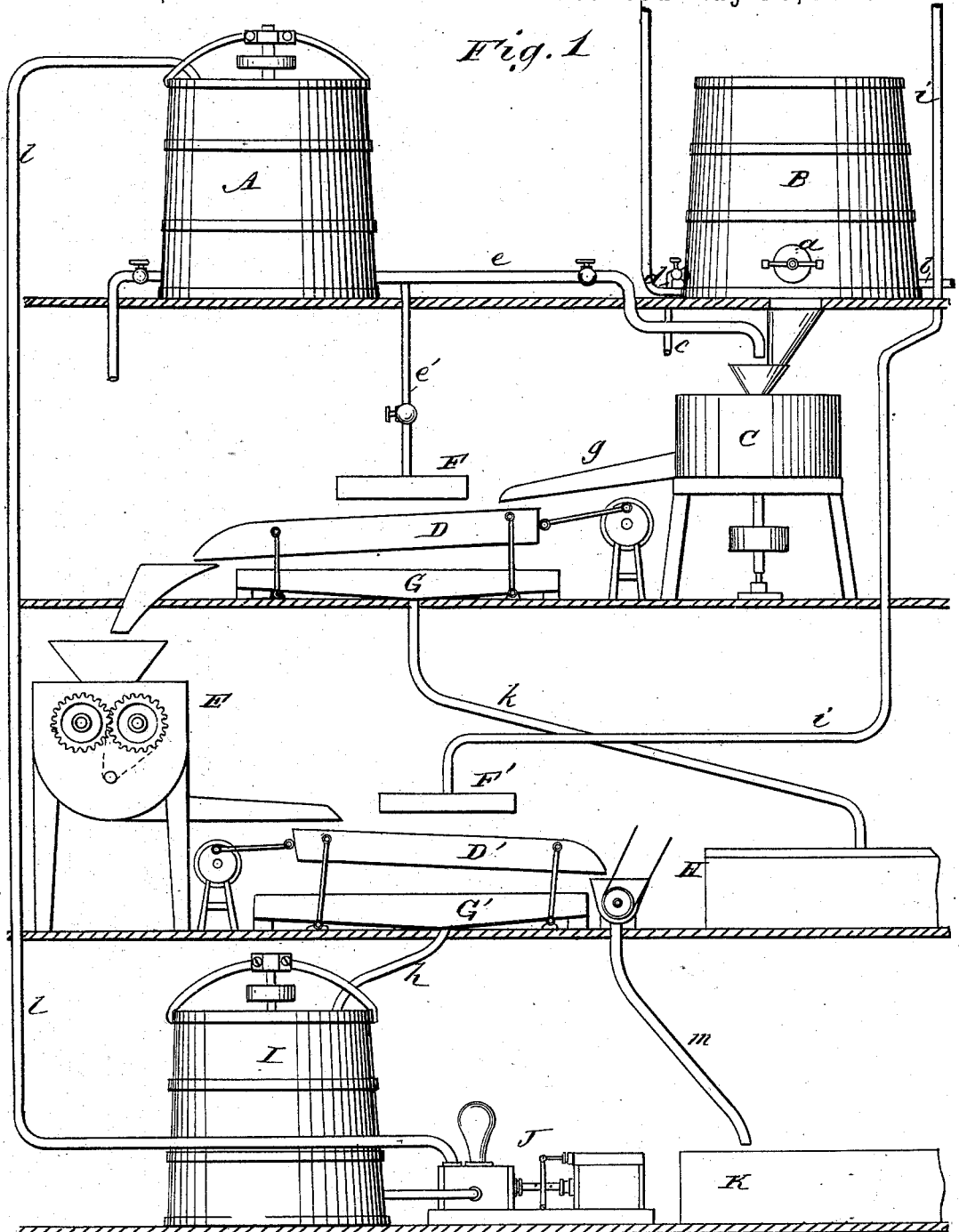
Figure 2:
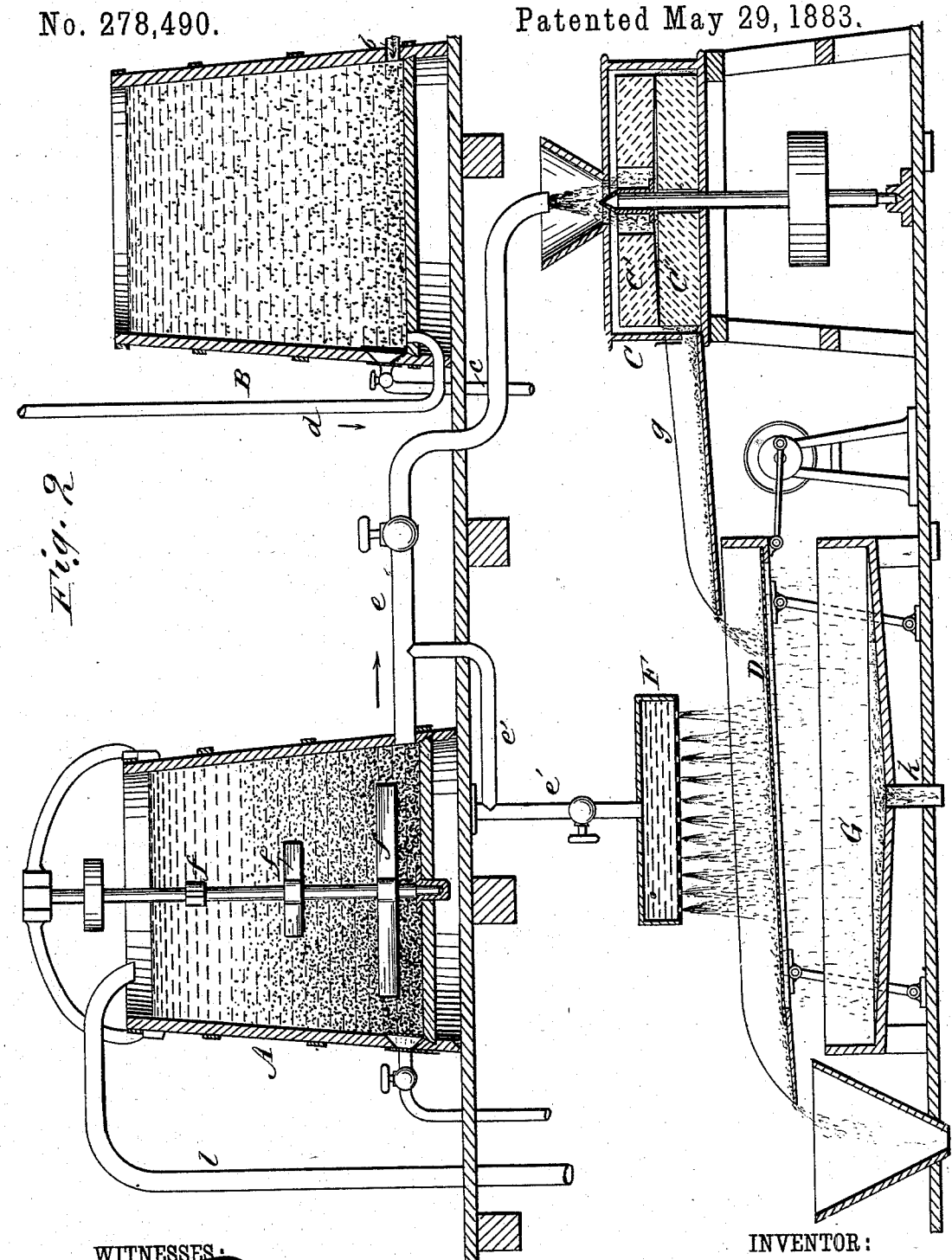
Figure 3:
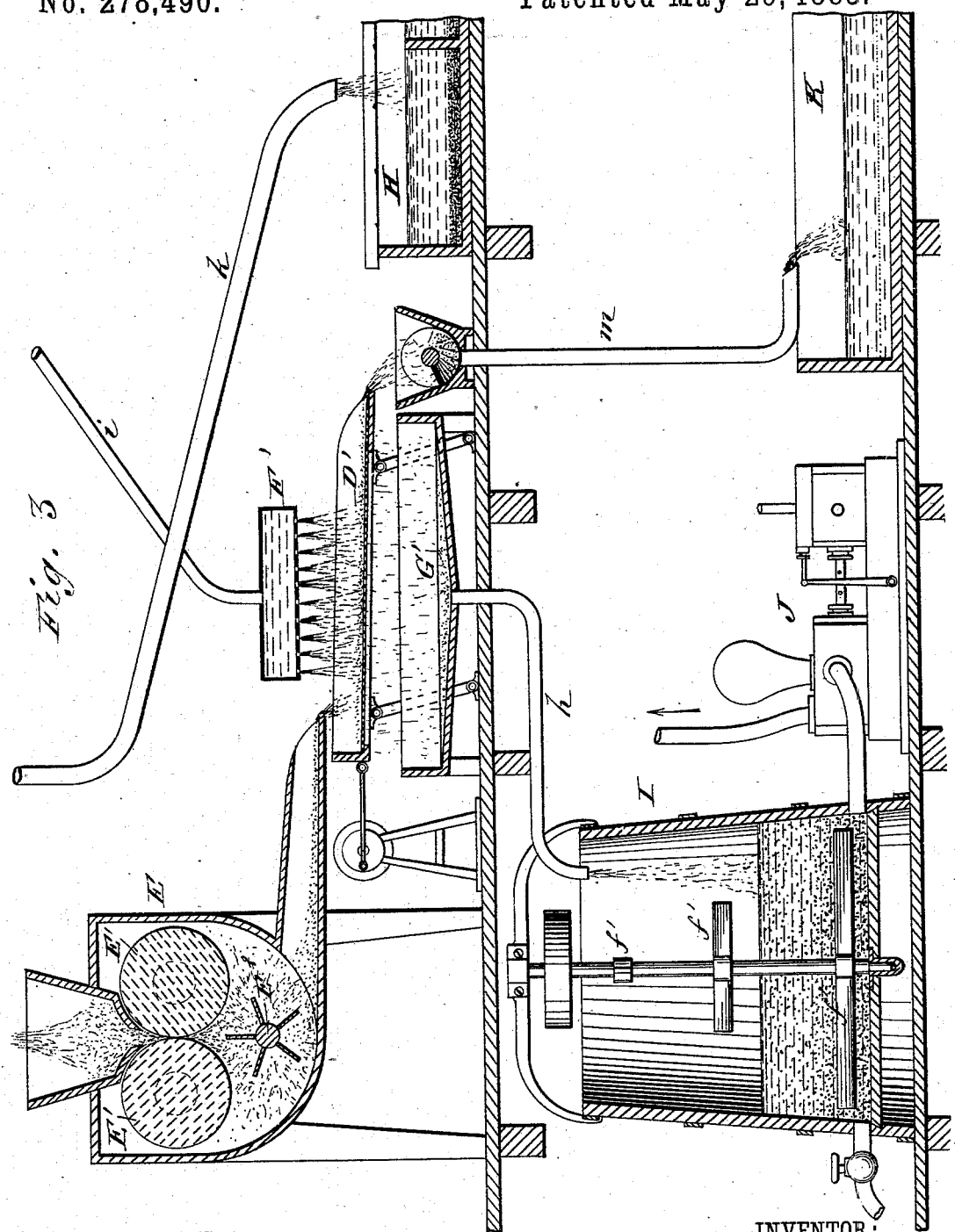
Figure 4:
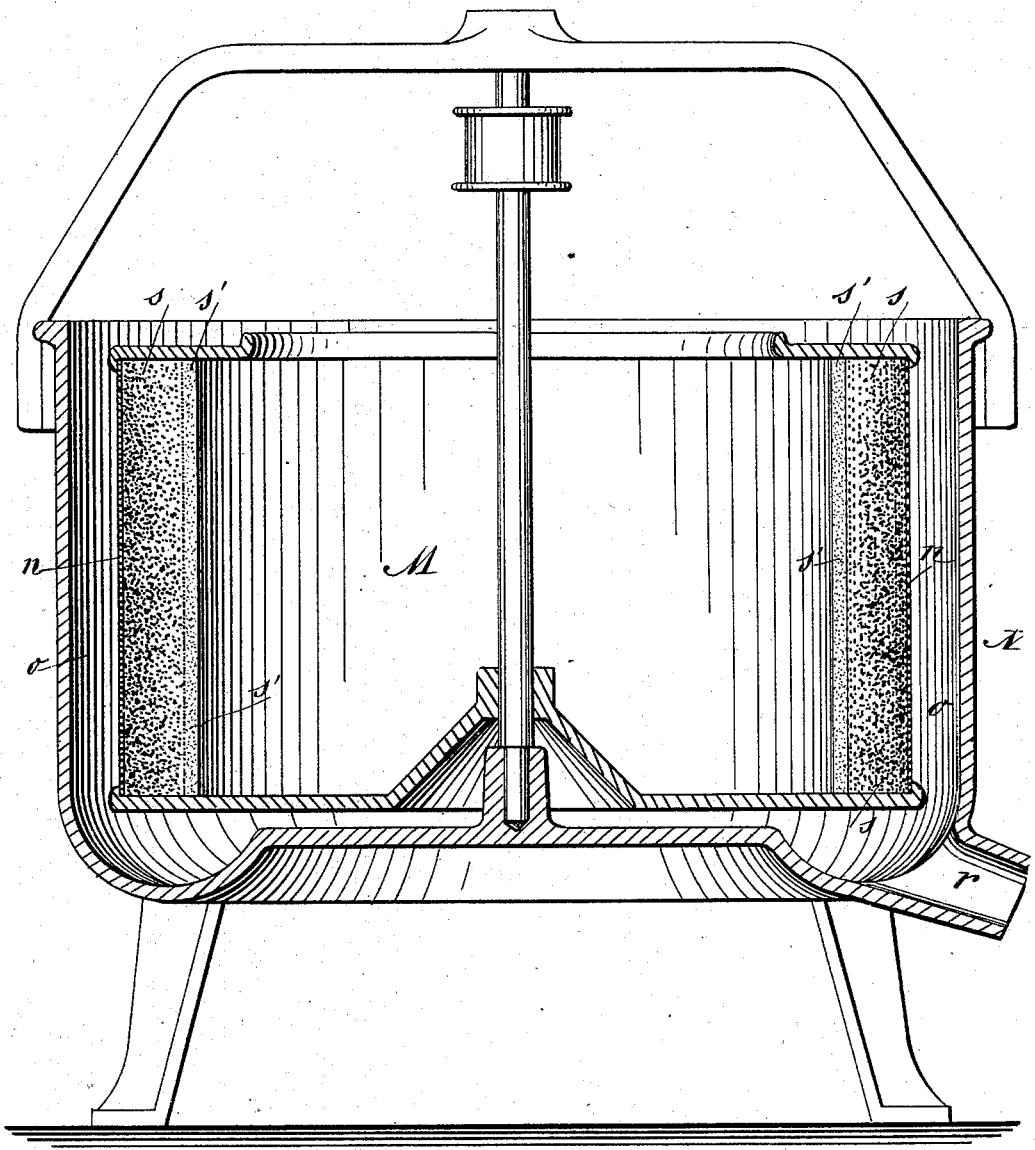

Figure 1 represents an elevation or general view of certain means or apparatus adapted to put into practice my invention. Fig. 2 is an elevation of said means in part, upon a larger scale, in illustration of the early stage of the process; and Fig. 3 is a like view of apparatus used in a subsequent stage of the process. Fig. 4 is a sectional elevation of a centrifugal machine used in drying and separating the pulp or fine settlings.

In the drawings, B indicates a wooden tank in which the corn or other grain is steeped in warm water that may vary from 145° to 160° Fahrenheit, more or less, according to the season of the year, it being necessary to have it warmer in winter than in summer. No more corn or grain should be introduced at any one time within this tank than, when the tank is charged with water, will give space for the grain to swell in steeping. After the grain has thus sufficiently steeped under a high temperature fresh water varying from 130° to 140° Fahrenheit (more or less) is admitted from below by a pipe, $b$, or otherwise, to the tank B, and run off at top, and the water on the grain is changed, either continuously or at intervals, to avoid souring of the grain. After a lapse of from twenty-four to thirty-six hours (more or less) the warm water is run off from the steeping-tank B by a pipe, $c$, and cold water, which may be supplied by a pipe, $d$, from a tank (not shown in the drawings) arranged above the steeping-tank or other source, is admitted to the tank B, at or near its bottom, and run off at top for a sufficient time to effect the cooling down of the corn. This washing with cold water serves to remove all nitrogenous and oily matters dissolved by water, as well as all organic acids and products of any fermentation that may have begun in the grain, notwithstanding the treatment hereinbefore described to prevent it. The corn is now passed, by a large valve or door, $a$, from the tank B to a mill, C, consisting of a pair of burr-stones, $C'C'$, to be ground; or, instead of burr-stones, iron, granite, or porcelain rollers, or any of them combined, may be used; but it is preferred, as shown in the drawings, first to grind the corn between a pair of burr-stones, $C'C'$, and from thence to pass the pulp by a spout, $g$, onto a shaking screen or sieve, D. The finely-ground pulp may be divided on as many of such sieves or separators as may be necessary to effect the separation of the starch from the pulp. The washed-out starch from the sieve or sieves D passes into a receiver, G, from whence it is conducted by a pipe, $k$, onto a starch table or trough, H, where the starch settles down, while the gluten, oil, and fine fiber float off. The coarser particles going over the end of the sieve or separator D are conducted to suitable machinery that will either give them a thorough beating or regrind them, or both, any suitable mill or set of rollers being employed for the purpose. My experience, however, induces me to prefer a crusher, E, provided with porcelain rollers $E'E'$, having combined with them a beater, $E^2$. By passing through these rollers, or other crushing, regrinding, or beating machinery, the starch remaining with the screenings is mostly set free, and from such machinery the pulp passes onto another sieve or separator, $D'$, or, if desired, onto any number of such separators, and during such passage the starch is washed out and separated from the fibrous and other matters, fresh water being supplied for the purpose by any number of sprinklers $F'$, which may draw their supply by a pipe or pipes, $i$, from the cold-water tank. To effect these first and second separations I prefer to use silk bolting-cloth of different grades, not only as regards adapting the separators to their respective and successive operations, but according to the newness or oldness of the corn, and the season, whether summer or winter, in which the work is being carried on.

In explanation of my improved process it should here be observed that the pulp in passing over the first shaking sieve or sieves, D, is insufficiently washed at the edges or along the rails of the frames of such separators, and considerable starch remains in the same; but by the hereinbefore-described regrinding or beating of the pulp a thorough mixing up takes place. Besides, new cells are opened, and considerable starch adhering to the glutinous, oily, or fibrous substances is set free and washed out during the second separation. The starch-water from this second separator, D', passes into a receiver, G', and from thence by a pipe, $h$, into a tank, I, which is provided with an agitator, $f'$, and from whence it is conveyed by a pump, J, and pipe $l$ to a tank, A, to be used over again in the mill or mills for first grinding, and on the first separator or separators, D, by means of a connection, $e'$, with the tank A or its pipe $e$, and any number of washing-sprinklers F, arranged over the separators D. In this manner or by these means the starch is very thoroughly separated from the pulp, after which the pulp-tailings that pass by a pipe, $m$, into a tank, K, are conveyed to one or more presses, which may either be roller, screw, or hydraulic presses, or all combined, or which may be any description of press or presses. The object of thus subjecting the pulp to a press action is to get rid of as much water as possible by mechanical means, which is cheaper than evaporating it. Instead, however, of thus subjecting the pulp to the action of a press or presses, or as a subsequent operation to get rid of the water and to prepare the pulp for kiln-drying, I use centrifugal force, and, from experiments made, find it to be the best agent for the purpose. Any of the well-known centrifugal machines used for separating crystallized sugar from its mother-liquor or sirup will answer. The wire cloth or screen inserted in the drum of such machine should have its fineness regulated by the coarseness or fineness of the pulp to be treated, and this will depend largely upon the previous means employed in treating the corn or grain. Thus the pulp taken from a mill after its passage through a beating-machine or disintegrator is not as fine as the pulp that passes through a set of porcelain or other rollers, and a screen of wider mesh can be used for expelling the water from the former than from the latter.

Fig. 4 of the drawings shows, upon a larger scale than the other devices are represented in, a centrifugal machine suitable for the purpose.

M is the revolving drum or basket of the machine, into which the pulp is put, and $n$ its screen.

N is the stationary casing around the basket, and between which and the screen $n$ is a space, $o$, where the water which is thrown off from the pulp collects and is run off by a nozzle, $r$.

In the operation of the machine the refuse, as indicated by the letter $s$, will accumulate in the basket around the screen.

After all the water has been expelled from the pulp that it is possible to extract by the centrifugal machine said machine is stopped and the pulp shoveled out or broken off and dropped through an opening in the bottom of the drum or basket, according to the construction of the machine. The pulp is now ready to pass on to a drying-kiln or apparatus of any suitable construction to extract the remainder of the moisture by heat, after which the dried pulp may be stowed away or shipped, and will keep without danger of spoiling, as by the peculiar manipulation which has been described fermentation and formation of lactic and other organic acids are very effectually prevented, and any such that may have formed are washed out with the starch. From the time the pulp leaves the last separator to the time it becomes heat-dried the time is so short that no acids can well be formed.

It has already been described that the water going through the first separator, D, and containing the bulk of the starch from the grain, is run on starch tables, runs, or troughs H, which need not differ from similar devices already in use. In these the starch settles, and the nitrogenous, fibrous, and oily substances float over the ends of said tables with the water. These matters and the water are let into shallow tanks or cisterns constructed of any suitable water-tight material and of any desired capacity, but preferably of as little depth as possible to promote and expedite the settling of all matters contained in the water; and it is desirable to have the contents of each tank changed as often as possible to avoid fermentation. After one such tank is filled it is left to settle and the clear water drawn off. Sulphurous acid, alum, borax, or other suitable substance may be added to the water in the tanks to preclude fermentation, but which addition not only prevents settling of the different matters contained in the water, but makes them less desirable for feeding cattle. After sufficient time has been given to effect settling, the clear water is drawn off and a thick, cream-like mass remains, which may be raised by an elevator or pump to a stirring-tank, and from thence be transferred to a centrifugal machine or machines, as hereinbefore described. These machines may have a cloth of canton-flannel or wool arranged over the wire screens and fastened on the inside periphery of the rotating drum or basket for the purpose of retaining all the solid matters contained in the creamy settlings hereinbefore referred to, while the water passes through. The matter left adhering to the peripheral portion of the drum, after the water has been expelled by the operation of the centrifugal machine, forms into a cake of rather dry consistency, composed, as is found on breaking up the cake, of several layers of different substances arranged concentrically one within the other, according to their different specific gravities, starch being the inner layer. This inner layer (marked s' in Fig. 4) may be scraped off and removed from the remainder of the material in the drum, (designated s in the same figure.) After all the starch has been scraped off and separated the remainder of the solid matter is broken off and removed. The starch which has been extracted from the centrifugal machine is added to that taken from the starch-tables, and is further treated in common with it. The other matters removed from such machine or machines are passed through a disintegrator, or other machine capable of reducing the same to a damp powder, which powder may be separately dried, or be mixed with the coarse meal or pulp which passed over the end of the second separator, D', after such pulp has been passed through the presses or centrifugal machine, as hereinbefore described. By mixing both these offals or leavings from the corn or grain a very valuable feed is gained, containing all the original ingredients, less the starch, which has been removed, and any substances soluble in water.

I have found that a very convenient and labor-saving construction of the centrifugal machines, as used both for the coarse pulp and the fine settlings, is to make them with openings in the bottom of the drum; and, furthermore, to provide underneath the centrifugal machine or machines two parallel screw-conveyers, and to combine with them devices capable of manipulation from the exterior to throw the substances dropping out of the drum into either of the conveyers, one of which is used to conduct the starch into one receiver and the other to conduct the offal or feed into another receiver. By the second grinding, disintegrating, or beating of the corn or pulp as it leaves the first separators, and subsequently passing it over the second separators, starch adhering to the glutinous or fibrous matters or inclosed in the cellular substances of the pulp as it passes from the first separators will be set free and washed out.

By my improved method of operation, also, the loss of starch, which is incidental to the collection of material along the edges of a single separator, and sometimes in streaks in the center of it, is avoided, and the mixing up of the pulp by its passage through a second disintegrating, grinding, or beating apparatus insures a more complete extraction of the starch. Again, the water containing the starch should be as concentrated as possible to economize the amount of starch-table surface which will be dependent upon the amount of water used. This I accomplish by using fresh water on my second separators only, and then use the starch-water from the second separators on the first separators and in the mills, thus saving both water and room on the table-floors. My improved method of operation, too, avoids many objections which are incidental to the methods heretofore practiced—viz., either the destruction of much of the foreign or refuse matters left after the starch has been extracted, or impairment of their value for stock-feeding purposes, or the loss of starch in this refuse. This refuse is so mixed with water that it cannot be utilized to a very great extent. Some have mixed the water containing this refuse, as it runs from the starch-tables, with the coarse feed—that is, the screenings coming from the separators—in such a manner that the water filters through the same and the insoluble gluten is retained, or else the water has been collected in large cisterns and allowed to settle, and the cream-like mass so obtained sold or utilized for stock-feeding purposes. In this state it will sour quickly and soon be destroyed.

By the use of the centrifugal machines I not only effect the drying, to a large extent, by mechanical means, of the coarse pulp and fine settlings, or either, but separate the starch remaining in the refuse. The collection of the glutinous and fibrous materials from the tailings of the starch-tables and treating them, as described, in the centrifugal machine for further separation of the starch is of no small importance. This in no way conflicts with a mere subsiding-tank for the starch, or with running the starch-water from the separator over tables to settle the bulk of the starch, and collecting the water running over the tail of the tables in tanks to allow the insoluble matters to subside, and then drawing off the water or part thereof and stirring up and treating with caustic alkali, and subsequently agitating the settlings of starch, glutinous, and fibrous matters and running them over a second set of tables to allow the starch to subside and the impurities to float off. Furthermore, by my improved process I largely avoid fermentation, and any organic acids formed are thoroughly removed by the method of washing out the starch, and I effect considerable economy in separating the water as much as possible by mechanical means.

Having thus fully described my invention, I claim as new and desire to secure by Letters Patent—

1. The herein-described method of manufacturing starch and obtaining other products from grain by the separation of the starch, consisting in grinding or crushing the steeped grain, sifting the same while subjected to sprays of water, subjecting the coarser particles to a second grinding or disintegrating process, sifting the reground or disintegrated mass while subjected to sprays of water, and subsequently separating the product from the water with which it is combined, as set forth.

2. The combination, with the steeping-tank B, the mill C for reducing the steeped grain to pulp, one or more sieves, D, for separating the starchy matter from the pulp, and sprinklers F, arranged above said sieve, of a second grinding and beating or disintegrating device, E, for further reducing the pulp, one or more second sieves, D, for separating the watery matter from the mixed and further reduced pulp, and sprinklers F', arranged above the said sieves, substantially as and for the purpose set forth.

3. The herein-described method of separating starch from grain, consisting in steeping the grain, grinding or disintegrating the same, passing it over separators while subjected to sprays of starch-water, regrinding the coarser particles, and passing the reground mass over separators while subjected to sprays of fresh water, as set forth.

LOUIS P. BEST.

Witnesses:
 PETER A. BOYLE,
 A. JACKSON HIRSCHL.